Figure 1:
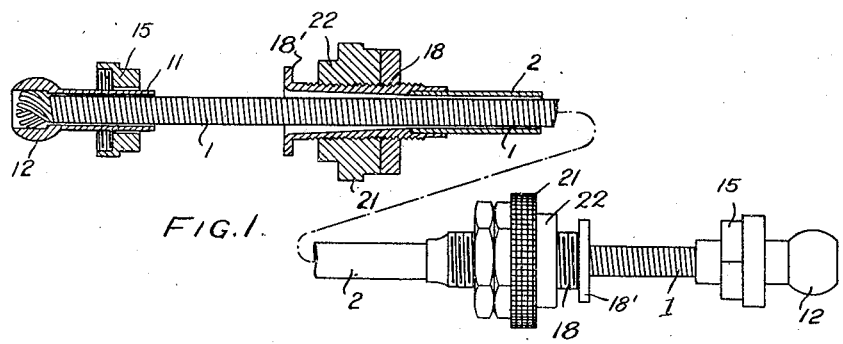

April 13, 1926.  1,580,877

W. E. BARBER

REMOTE CONTROL MECHANISM

Filed Sept. 28, 1925   5 Sheets-Sheet 1

Inventor
William E. Barber
By
James L. Norris
Attorney

April 13, 1926.
W. E. BARBER
REMOTE CONTROL MECHANISM
Filed Sept. 28, 1925
5 Sheets-Sheet 2
1,580,877
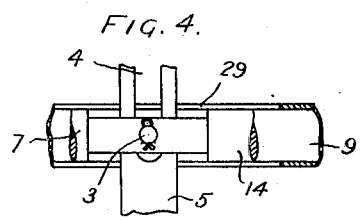
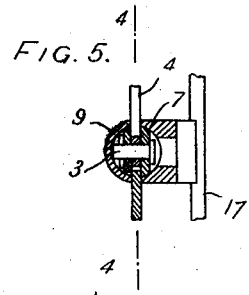
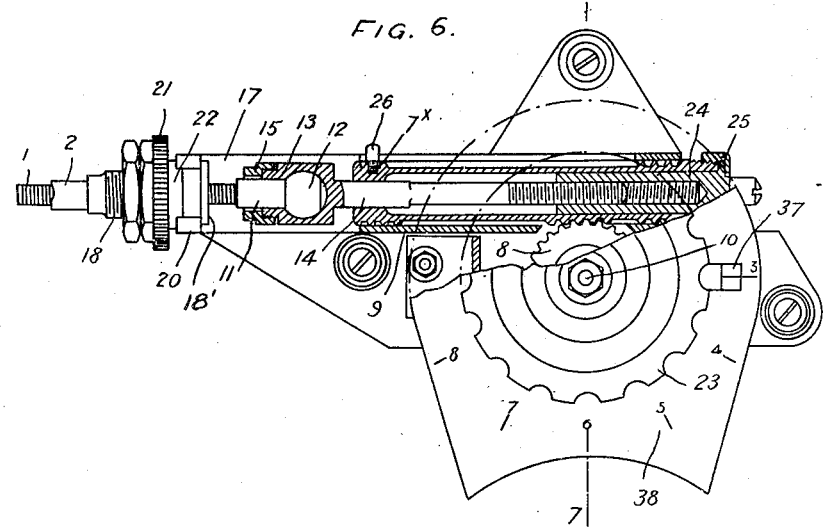
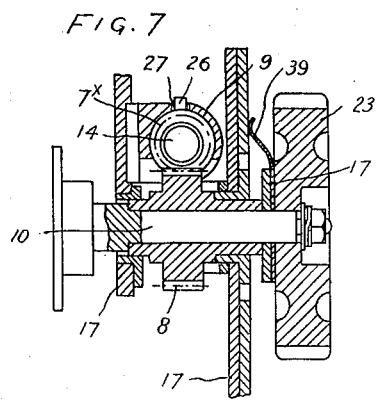
Inventor
William E. Barber
By
Attorney April 13, 1926.
W. E. BARBER
REMOTE CONTROL MECHANISM
Filed Sept. 28, 1925  5 Sheets-Sheet 3
1,580,877
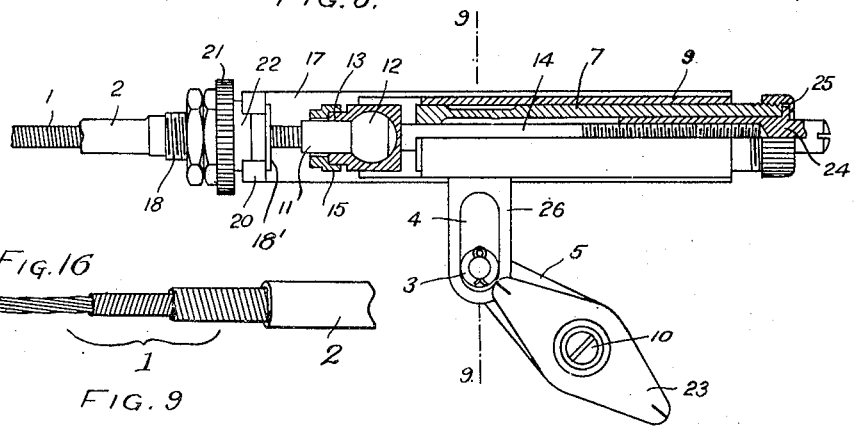
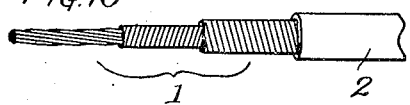
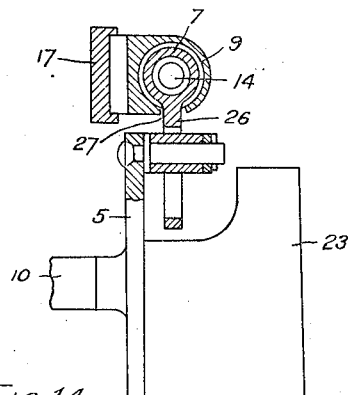
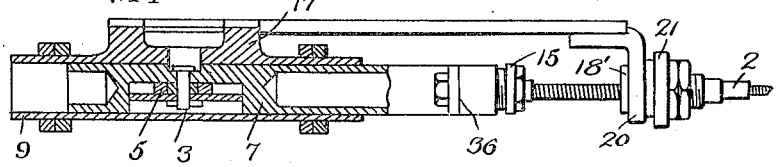
Inventor
William E. Barber
By
James L. Norris
Attorney April 13, 1926.
W. E. BARBER
REMOTE CONTROL MECHANISM
Filed Sept. 28, 1925        5 Sheets-Sheet 4
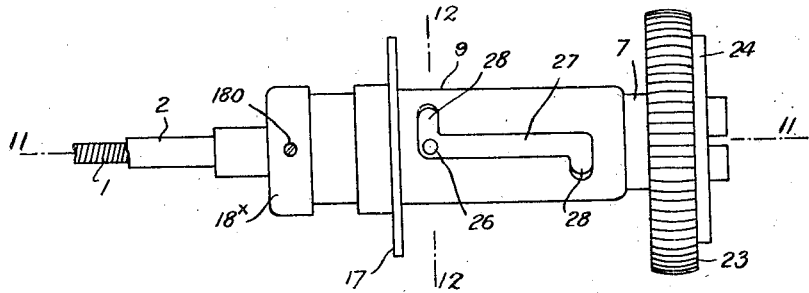
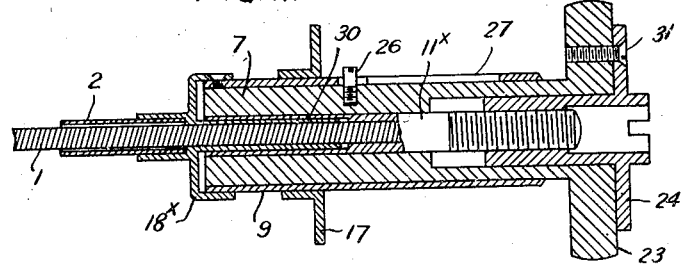
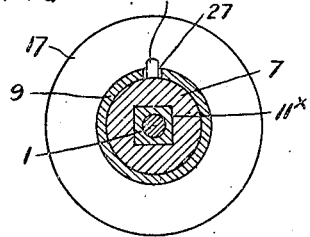
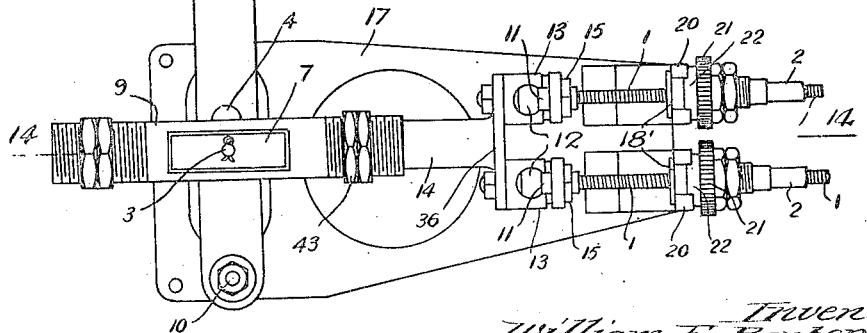

April 13, 1926.
W. E. BARBER
1,580,877
REMOTE CONTROL MECHANISM
Filed Sept. 28, 1925   5 Sheets-Sheet 5
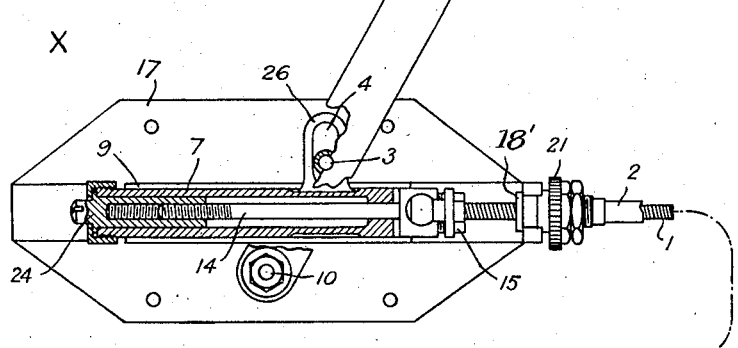
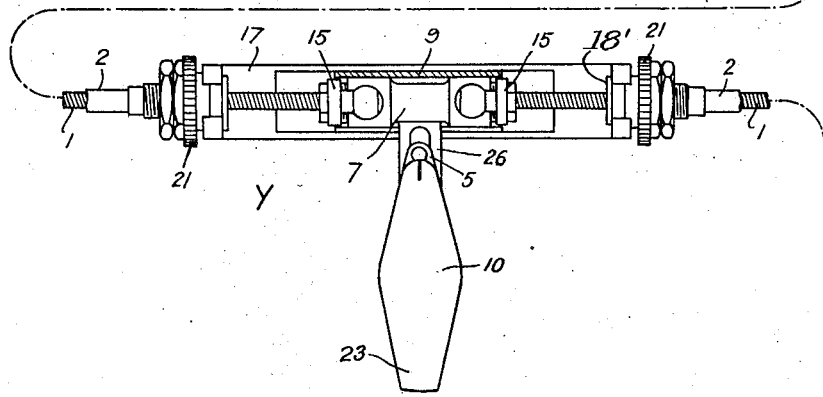
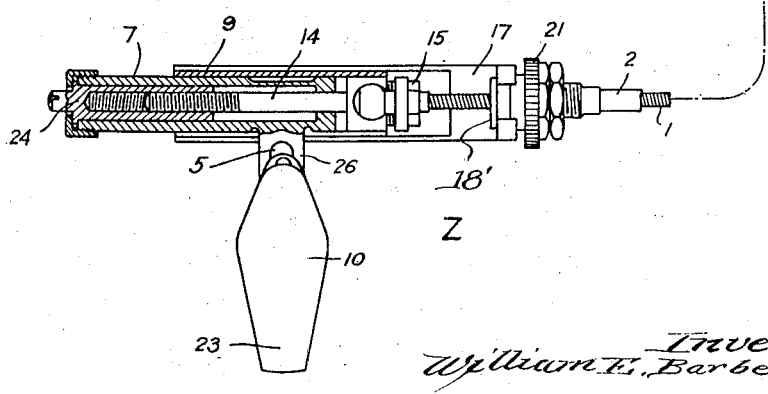
Inventor
William E. Barber Patented Apr. 13, 1926.

1,580,877

UNITED STATES PATENT OFFICE.

WILLIAM EDWARD BARBER, OF FARNBOROUGH, ENGLAND.

REMOTE CONTROL MECHANISM.

Application filed September 28, 1925. Serial No. 59,233.

*To all whom it may concern:*

Be it known that I, WILLIAM EDWARD BARBER, a subject of the King of Great Britain, residing in Farnborough, England, have invented certain new and useful Improvements in or Relating to Remote Control Mechanism, for which application for patent was filed in Great Britain on July 18, 1924, No. 14,727, and of which the following is a specification.

This invention relates to improvements in remote control mechanism for actuating devices at a distance. The improved mechanism is particularly suitable for operating switches, handles, indicating means or other parts of electrical instruments, such as condensers, inductances, resistances or other wireless apparatus, or air craft or other places, or for controlling engines, lighting equipment, bomb release gear or photographic apparatus, on aircraft or other places, but may be used for other purposes.

The invention provides remote control mechanism which enables movement of a positive or negative character or tension or pressure to be transmitted from one or more control positions to one or more distant devices.

According to one feature of the invention remote control mechanism for transmitting positive and negative movement or for transmission of traction or thrust comprises two members, both of which are practically inextensible and incompressible, arranged one within the other, the inner member fitting and being movable longitudinally within the outer member, which is stationary and being composed of superposed windings of coiled wire of which adjacent layers are wound with opposite hands or in opposite directions, and the outer member consisting of piping which can be bent in any direction. Each layer of the inner member may be wound with multiple wires side by side. The coiled wire consists of wire coiled in helical coils of small pitch tightly wound on one another in opposite directions, whereby a composite inner member is produced possessing inextensible properties.

The inner member may be connected to operating or operated devices situate at terminal or intermediate positions of the system.

The arrangement permits the accurate transmission of longitudinal movement from one part to another along a line of transmission lying in planes at an angle to one another.

In a modification of the invention, the inner member may be adapted to move longitudinally within the outer member for primary purposes and to move rotationally within the outer member for secondary purposes.

Other features of the invention comprise special means for connecting the inner member to the operating or operated devices, terminal fittings for the ends of the inner member, means for adjusting the relative lengths of the inner and outer members, means for controlling the transmission of movement, and arrangements or constructions or transmission systems.

Figure 2:
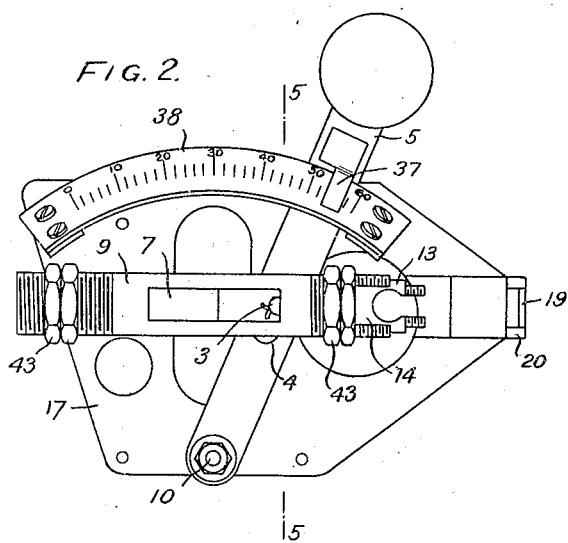
Figure 3:
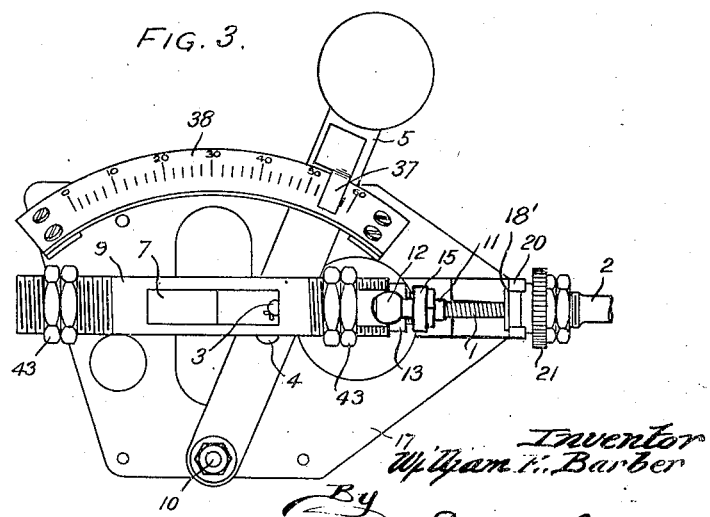

Various examples of remote control mechanism according to the present invention are illustrated, by way of example, in the acompanying drawings, in which Fig. 1 is, as to the right hand end, a longitudinal elevation and, as to the left hand end, a longitudinal section of an inner transmitting member and an outer pipe member provided with terminal fittings; Fig. 2 is an elevation of one form of operating device for use with the inner and outer members; Fig. 3 is an elevation showing the same operating device connected to the inner and outer members; Figs. 4 and 5 are, respectively, sectional elevations of details on the lines 4—4 in Fig. 5 and 5—5 (Fig. 2); Fig. 6 is an elevation, partly in section, of one form of operated device connected to the inner and outer members; Fig. 7 is a sectional elevation on the line 7—7 (Fig. 6); Fig. 8 is an elevation partly in section of another form of operated device connected to the inner and outer members; Fig. 9 is a sectional elevation on the line 9—9 (Fig. 8); Fig. 10 is a longitudinal elevation of another form of operating device connected to the inner and outer members, one form of means for adjusting the relative lengths of the inner and outer members, and one form of means for controlling the transmission of movement; Figs. 11 and 12 are sectional elevations on the lines 11—11 and 12—12 (Fig. 10); Fig. 13 is an elevation of an arrangement wherein more than one device can be operated from more than one control position; Fig. 14 is a plan, partly in section, on the line 14—14 (Fig. 13); and Fig. 15 shows a general arrangement of transmission system provided at terminal and intermediate positions with operating or operated devices.

Like reference numerals indicate similar parts wherever repeated in the drawings.

It will be understood that, in some cases herinbefore and hereinafter referred to, wherein a device is referred to as an operating device it may be used as an operated device, and vice versa.

Referring particularly to Fig. 1, the numeral 1 indicates an inner member in the form of a round rod composed of superposed windings of coiled steel or other suitable wire, each layer being wound with a different hand from the layer inside it, and each layer being wound with multiple wires side by side. 2 indicates an outer tube of drawn brass or other suitable metal, within which the flexible rod-like inner member can slide, the clearance between the inner and outer members being reduced to a minimum, so that the inner member fits and is movable longitudinally within the outer member. Owing to the flexible nature of the inner and outer members they can be bent to any convenient shape to suit various applications of the mechanism.

The inner member may be connected to an operating or operated device by means, for example, of a pin 3 and a slot 4 (Figs. 3, 4, 5, 8, 13 and 15) coacting between a plain slide 7 attached to the inner member and a lever or crank 5 on spindle 10, the slide being arranged in continuity with or otherwise made fast to the inner member and sliding in a stationary guide 9; or in place of the slide 7 and lever 5 there may be a slidable rack 7ˣ and a pinion 8 (Fig. 6), the rack being arranged in continuity with or otherwise made fast to the inner member and sliding in a stationary guide 9, and the pinion 8 being made fast on an operating or operated spindle 10 on the device.

Each end of the inner member may be secured in a ferrule 11 (Fig. 1) which is formed with a head 12 and slid into or out of engagement with abutments or jaws 13 (Figs. 2 and 3) on a stem 14 by a movement laterally of said jaws. The ferrule is locked in position between the jaws 13 by a nut 15 (Figs. 1, 3) encircling the ferrule and the jaws of the stem. The ferrule may extend along the inner member some distance to give rigidity to the end of the inner member where it projects through the end of the outer member. The stem 14 may be made as part of or may be fast to the slide 7 in the guide 9 which is mounted on a base plate or frame 17. The outer member may terminate within a thimble 18 (Fig. 1) through which the inner member 1 extends and which is adapted to guide the inner member. The thimble 18 has a flange 18' at one end which, when the thimble is introduced laterally into a key-hole slot 19 (Fig. 2) in a lug, bracket or the like projection 20 on the base plate, bears against one face of said projection, and a milled nut 21 screwed on the thimble has a shank 22 which, when the nut 21 is screwed up on the thimble 18 against the opposite face of said projection, is adapted to enter a countersink in the lug.

The system comprising the inner and outer members, terminal fittings, slides and base plates may be assembled and applied as a single unit where required. For example, the base plates may be adapted to slide in guides on an instrument to be operated. The connection between the inner member and the handle or part of the instrument to be operatd may be effected through a quadrant or the like adapted to be screwed or clamped on to the instrument handle and to be detached when it is desired to operate the instrument direct without the remote control connection. In Figs. 8 and 9, the connection between the inner member and the handle 23 of the instrument to be operated is effected by means of a roller 3 on a lever or crank 5 on the handle spindle 10, and a slot 4 in a projection on a plain slider 7 on the base plate 17.

The slides on the base plates may be associated with any convenient means for converting rectilineal motion into rotary motion or vice versa, such as slidable rack and rotary pinion gear 7ˣ, 8 (Fig. 6) or pin and slot or the like gear 3, 4 (Figs. 3, 8, 13, 16); to enable the slider 7 to be operated by the rotary handle, lever or the like 5, or vice versa.

A nut 24 (Figs. 6, 8, and 11) is provided adapted to work in an annular groove 25 in or against an abutment on the slide 7 and to rotate on the stem 14 or on a fitting 11ˣ on the inner member so as to alter the effective length of the inner member.

The operating means for effecting the transmission of movement may be adapted to limit the amplitude of movement. For example, a radial pin or projection 26 (Figs. 6, 8, 10) on a slide may engage a slot 27 in a guide 9 to limit the extent of axial movement. The radial projection may serve to prevent rotation of the slide in the guide and the radial pin 26 may be made to engage right or left hand bayonet slots 28 (Fig. 10) at the opposite ends of the slot 27 to lock the inner member against axial movement. When a lever 5 (Figs. 3, 13, and 15) is associated with a slide connected to the inner member by means of a pin and slot connection or the like, the lever may work in a slot 29 (Fig. 4) to limit the movement. Any suitable means may be provided for locking the slide in one or more predetermined positions. Similarly, any known means may be provided for imparting a varying movement, instead of a simple proportional movement, to the inner member from a regular turning of the cam.

In some cases, a slidable rack 7× (Fig. 6) of cylindrical form, made fast to the inner member and engaging a pinion 8, may be employed so that axial movement of the inner member causes the rack to slide and turn the pinion, and rotary movement of the inner member rotates the rack but leaves the pinion stationary.

The means for operating the inner member may be adapted to impart either axial or rotary movement alternatively to the inner member. For example, the inner member may be provided at one terminal position with a slide 7 (Figs. 10 and 11) which works in a cylindrical guide 9 and adapted to reciprocate within the cylinder or to be rotated about the axis of the slide and thereby impart corresponding movement to the inner member. In any case, where the inner member terminates and is connected to an operating or operated device, it may be provided, as aforesaid, with a ferrule or guide sleeve to make it rigid at this part.

The constructional arrangement shown in Figs. 1 to 5 comprises an inner member 1 and an outer member 2, the inner member being attached to a slide 7 and the outer member being attached to a base plate in the manner already described. The slide is connected by a pin 3 and a slot 4 to a hand lever 5 mounted on a spindle 10 on the base plate.

The movements of the lever are limited by nuts 43 on the guide 9, and are indicated by a pointer 37 on the lever and the scale 38 on the base plate.

The constructional arrangement shown in Figs. 6 and 7 comprises an inner member 1 and an outer member 2, the inner member being attached to the stem 14 preferably in the same manner in which the inner member is shown in Figs. 1, 2 and 3 as attached to the slide 7. The stem 14 is attached by means of an adjusting nut 24 working in a groove 25 to a cylindrical rack 7× mounted in a guide 9 on a base 17, and the outer member 2 is connected to the base 17, preferably in the manner in which the outer member is shown in Figs. 1, 2 and 3 as attached to the base plate. The rack engages a pinion 8 mounted on a spindle 10 supported on the base, on which spindle is a handle 23. The longitudinal movements of the rack are limited by engagement of a radial pin 26 on the rack with the ends of a slot 27 in the guide, and are indicated by a pointer 37 on the pinion and which moves over a scale 38 on a dial plate on the base. 39 is a friction spring carried by the handle and bearing on the dial plate.

The constructional arrangement shown in Figs. 8 and 9 comprises an inner member 1 and an outer member 2, the inner member being attached to a stem 14 in the same manner in which said member is shown in Figs. 1, 2 and 3 as attached to the slide 7, and the outer member being attached to the base 17 preferably in the same manner in which said member is shown in Figs. 1, 2 and 3 as attached to the base member. The stem 14 is attached by means of an adjusting nut 24 working in a groove 25 to a cylindrical slide 7. A radial projection 26 on the slide 7 has a slot 4 in which works a roller 3 carried by a stud on a crank 5 mounted on a spindle 10 supported on the base. The spindle 10 carries a handle 23. The longitudinal movements of the slide are limited by engagement of the radial projection with the ends of a slot 27 in the guide.

The constructional arrangement shown in Figs. 10 to 12 comprises an inner member 1 and an outer member 2, the inner member being attached by means of a square cross section ferrule 11× an adjusting nut 24, a setscrew 31 and a handle 23 to a slide 7 mounted in a cylinder 9 on a base 17, the outer member 2 terminating within a thimble 18× secured to the cylinder by a set screw 180. The nut 24 works against the handle forming an abutment on the plunger. The inner member is sweated in the ferrule 11×, and the thimble 18× is extended within the slide 7 as a ferrule or guide sleeve 30. The axial and rotary movements of the slide are controlled by a radial pin 26 on the slide engaging slots 27, 28 in the cylinder.

The constructional arrangement shown in Figs. 13 and 14 comprises duplicate inner and outer members 1, 2, the two inner members being attached by means of heads 12 on ferrules 11 and nuts 15 to separate pairs of jaws 13 on a yoke 36 to which is connected one end of a stem 14 which has its other end connected to one end of a slide 7 mounted in a guide 9 on a base plate 17. The outer members 2 are connected to the base plate 17 preferably in the same manner as shown in Figs. 1, 2 and 3. The slide is connected by a pin 3 and a slot 4 to a lever 5 mounted on a spindle 10 on the base plate, and the movements of the lever are limited by nuts 43 on the guide 9.

Fig. 15 shows an arrangement of remote control system for transmitting movement adapted at each terminal position X, Z, and at one or more intermediate positions Y with means for connecting an inner member 1 in an outer member 2 to an operating or operated device. In such arrangements the inner and outer members are provided with terminal fittings as previously described and as shown at the positions X, Y, Z.

In Fig. 15, an operating device 5 is arranged at one terminal position X and operating and operated devices 23 are arranged at the intermediate position Y, and at the other terminal position Z, of a remote control system. The operating device at X, Y or Z at the time being handled moves the operating devices at the time not being handled, so that all move in synchronism. The inner member 1 is in effect continuous at the intermediate position Y, so that the operated device at Y or Z can be operated from more than one control position. In the arrangement shown, a slide 7 in continuity with the inner member 1 at each terminal and intermediate position X, Y, Z is interconnected, by means of slot and pin gear to an operating or operated lever 5.

The form of control according to the present invention, wherein the main transmission is effected by longitudinal movement of the inner member, gives accurate and consistent working without loss of adjustment, both at slow and high speeds.

For purposes of remote control of wireless instruments or the like light apparatus, satisfactory results may be obtained with an inner member of $\frac{5}{32}$ inch diameter and composed of four layers of hardened and tempered flexible steel wires, sliding in an outer tube of 0.167 inch internal diameter and 0.036 inch thickness composed of solid drawn brass. Where controls are required for transmission of higher power, inner and outer members of larger diameters may be employed.

The special constructions and arrangements of inner and outer members according to the present invention are advantageous over Bowden wire for transmitting movement by means of a slide engaging a lever, or by means of a rack engaging a pinion or similar connections, for operating a plurality of devices from one control position, or for operating one device from a plurality of control positions, and the various constructional arrangements shown in the present specification have been specially designed to enable the improved arrangements of inner and outer members to be applied in the most advantageous manner.

The various devices shown for use with the inner and outer members for transmitting positive and negative movement have been specially devised for use in apparatus for such double purpose (inter alia, for maintaining alignment of the inner and outer members where they are engaged with the operating or operated devices), as distinguished from devices for transmitting movement only in one direction.

Having thus described the nature of the said invention and the best means I know of carrying the same into practical effect, I claim:—

1. Remote control mechanism for transmitting positive and negative longitudinal movement, comprising a pair of relatively movable inextensible and incompressible members arranged one within the other, the inner member being composed of superposed windings of closely coiled wire of which adjacent layers are wound in opposite directions, and the outer member consisting of tubing bendable in any direction.

2. Remote control mechanism as claimed in claim 1, wherein each layer of windings of the inner member consists of multiple wires side by side.

3. Remote control mechanism for transmitting positive and negative longitudinal movement, comprising a pair of relatively movable and inextensible and incompressible members arranged one within the other and of which the inner member is composed of superposed windings of closely coiled wire having adjacent layers wound in opposite directions, a guide, and a slide connected to one of said relatively movable members and movable in said guide.

4. Remote control mechanism according to claim 3 embodying means for converting the longitudinal movement of the slide into rotary movement.

5. Remote control mechanism for transmitting positive and negative longitudinal movement, comprising a pair of inextensible and incompressible members arranged one within the other, the outer member being fixed and consisting of tubing bendable in any direction and the inner member being composed of superposed windings of closely coiled wire of which the adjacent layers are wound in opposite directions, the inner member being movable longitudinally within the outer member for primary purposes and rotatable within the outer member for secondary purposes.

6. Remote control mechanism according to claim 1 wherein the outer member is fixed and the inner member is movable and wherein the inner member is connected with operating or operated devices situate at terminal or intermediate portions of the mechanism.

7. Remote control mechanism for transmitting positive and negative longitudinal movement, comprising a pair of inextensible and incompressible members arranged one within the other, the outer member being fixed and consisting of tubing bendable in any direction and the inner member being composed of superposed windings of closely coiled wire of which the adjacent layers are wound in opposite directions, the inner member being longitudinally movable within the outer member, a terminal fitting secured to the end of said inner member, a slide having jaws between which said fitting may be inserted in a direction transversely of the direction of the length of said inner member for connecting said inner member and slide together, and means associated with said fitting and said jaws for locking said fitting between said jaws.

8. Remote control mechanism for transmitting positive and negative longitudinal movement, comprising a pair of inextensible and incompressible members arranged one within the other, the outer member consisting of tubing bendable in any direction and the inner member being longitudinally movable within the outer member, a thimble connected to said outer member and serving as a guide for said inner member, a fixed member having a slot to receive said thimble and a countersink, and a nut associated with said thimble and having a shank adapted to enter said countersink for securing said outer member to said fixed member.

9. Remote control mechanism according to claim 1, comprising a stationary guide, a slide movable in said guide, a fitting secured to the movable member and engageable with said slide, and a nut adjustable on said movable member for varying the effective length of said movable member.

In testimony whereof I have signed my name to this specification.

WILLIAM EDWARD BARBER.